United States Patent [19]
Lee et al.

[11] Patent Number: 5,504,731
[45] Date of Patent: Apr. 2, 1996

[54] REMOTE FINE POSITIONING MECHANISM

[75] Inventors: Neville K. Lee, Sherbourn; Amit Jain, Marlboro, both of Mass.; Erwin Keppeler, Marktoberdorf, Germany

[73] Assignee: Quantum Corporation, Milpitas, Calif.

[21] Appl. No.: 847,113

[22] Filed: Mar. 6, 1992

[51] Int. Cl.$^6$ ................................... G11B 7/135
[52] U.S. Cl. .................. 369/112; 369/44.14; 369/44.21; 369/119
[58] Field of Search ............................ 369/44.14, 44.17, 369/44.18, 44.19, 44.21, 44.28, 44.12, 112, 119

[56] References Cited

U.S. PATENT DOCUMENTS

| | | | |
|---|---|---|---|
| 4,101,947 | 7/1978 | Lambeth | 360/114 |
| 4,451,863 | 5/1984 | Yanagida et al. | 360/114 |
| 4,712,887 | 12/1987 | Baer . | |
| 4,768,179 | 8/1988 | Gottfried | 369/44.17X |
| 4,768,184 | 8/1988 | Cottfried | 369/44.17X |
| 4,785,438 | 11/1988 | Mizunoe | 369/13 |
| 5,014,252 | 5/1991 | Akasaka et al. | 369/13 |
| 5,020,041 | 5/1991 | Nakao et al. | 369/13 |
| 5,068,845 | 11/1991 | Yagi | 369/112 |
| 5,151,890 | 9/1992 | Yonekubo | 369/44.14 X |
| 5,153,870 | 10/1992 | Lee et al. | 369/112 X |
| 5,199,020 | 3/1993 | Kim et al. | 369/112 |

FOREIGN PATENT DOCUMENTS 2621160 3/1989 France .
61-188751 8/1986 Japan .

OTHER PUBLICATIONS

Moritsugu, et al, "New Optical Head for Magneto–Optic Library Units"; Proceedings of SPIE, vol. 1078, 19 Jan. 1989, Los Angelos, CA, U.S., pp. 131–137.
Kudou, et al, "Magneto–Optical Disk Drive Sub–System"; Fujitsu–Scientific and Technical Journal, vol. 26, No. 4, 1990, Kawasaki JP.
Ohr, "Optical Tracking Practices Some Intricate New Steps"; Electronic Design, vol. 34, No. 111, Dec. 1986, Hasbrouck Heights, New Jersey US.

*Primary Examiner*—Georgia Y. Epps
*Assistant Examiner*—Muhammad Edun.
*Attorney, Agent, or Firm*—Cesari and McKenna

[57] ABSTRACT

A remote fine positioning mechanism of an optical storage device includes a stationary galvanometer-controlled mirror (galvo mirror) and an imaging lens, the imaging lens positioned to provide an image of the galvo mirror at the front focal point of an objective lens mounted to an optical head assembly. The galvo mirror functions as a beam steering element that is rotated about a steering axis to change the angle of incidence of a collimated laser beam with respect to the objective lens during track selection operations. Thus, for rotation of the galvo mirror to change the direction of the laser beam, the system operates as though the mirror were physically located at that focal point. To perform the imaging function, the imaging lens decollimates the beam. A collimation-correction lens is therefore provided to ensure, in combination with the imaging lens, that the laser beam remains collimated when it reaches the objective lens.

11 Claims, 6 Drawing Sheets

REMOTE FINE POSITIONING MECHANISM

FIELD OF THE INVENTION

This invention relates generally to optical storage systems and, more specifically, to an enhanced remote fine positioning mechanism of an optical storage system.

BACKGROUND OF THE INVENTION

In a typical optical storage system, information is generally stored in spiral or concentric circular tracks on a rotating disk. The track density of an optical storage system is typically an order of magnitude greater than that of a magnetic storage system. In the case of a read-write optical system, a polarized laser beam may be used for both storage (writing) and retrieval (reading) of the data. The system includes an optical head carrying an objective lens that converges the laser beam on a small spot on a selected track on the disk surface and an actuator that moves the head radially over the disk surface for access to different tracks.

Because of the increased track density, optical storage systems typically utilize a two-stage track access system: (i) a coarse track-access mechanism for large scale movement of the laser beam, i.e., over a relatively large number of tracks, and (ii) a fine-positioning mechanism to move the beam over a limited number of tracks and to follow the center line of the selected track. The laser beam is collimated and, ideally, it is directed through the front focal point of the objective lens so that when the lens converges the beam at the disk surface, the light reflected from the surface returns along the path of the incident laser beam. This helps to provide the accuracy required in the servo system that maintains the converged beam on the centerline of the track on which the head is positioned. This function is also termed "track-following."

Coarse track access is accomplished by radial displacement of the entire optical head. Fine track access is typically accomplished by means of a 2-dimensional voice coil actuator mounted on the optical head and moving the objective lens lateral across tracks on the disk surface. The actuator also moves the lens axially for focusing of the beam. This results in a massive head assembly which hinders performance of coarse movement and which requires displacement of the entire head. Moreover, the space occupied by the fine-track actuator prevents close spacing of the disks if a multiple-disk system is contemplated.

The mass of parts on the head assembly may be decreased by using a stationary fine-track actuator. This "remote" approach, which has been suggested for track following, may involve the use of a remote lens that is moved transversely with respect to the optical axis to change the position of the collimated laser beam at the objective lens; alternatively, a mirror mounted to a high-speed galvanometer may be rotated to change the angle of incidence of the beam at the objective lens. This latter arrangement has not, however, been successfully implemented for fine-positioning operations, which require a substantially greater angular displacement of the beam than does track-following.

More specifically, because the track-following actuator is relatively far removed from the objective lens, even small angular adjustments of the laser beam result in a large transverse displacement of the beam at the objective lens. This typically leads to beam "clipping" and an accompanying loss of beam energy. In addition, the displaced beam is far removed from the front focal point of the objective lens. As a result, the reflected beam does not return along the path of the incident beam, a phenomenon known as "beam walk-off", and the position sensor used in the track-following servo system has a large offset error. For similar reasons, fine-positioning by means of a remote lens is impractical. In order to minimize these problems, previously known systems have generally avoided use of remote fine positioning mechanisms.

Several possible remote fine positioning mechanisms might be employed to resolve these problems. One approach involves the use of a relatively large (and expensive) optical prism having parallel faces in conjunction with the rotating mirror. The prism is rotated to translate the laser beam and thereby center it on the front focal point of the objective lens regardless of the angular displacement of the beam by the mirror. This requires an additional actuator to rotate the prism. In addition, the large prism responds slowly to control signals, thereby reducing the bandwidth of the system.

An alternative approach involves the use of two galvanometer-rotated mirrors positioned in tandem in the path of the laser beam. With proper positioning of the mirrors and control of their movements, the direction of the beam can be changed without a corresponding translation of the beam away from the front focal point of the objective lens. However, because two active, moving elements are used, a complex servo system is required to control this mechanism. Also, the back-to-back galvanometer configuration is inefficient because it requires relatively large angle excursions to produce small, compensated angle excursions at the objective lens.

Therefore, it is desirable to provide an efficient remote fine positioning mechanism for a high-performance, optical storage system.

It is also desirable to provide a remote fine positioning mechanism capable of track selection as well as track-following operations.

In addition, it is desirable that the remote fine positioning mechanism exhibit minimal beam clipping and walk-off, yet maintain low-cost, high-performance characteristics.

SUMMARY OF THE INVENTION

Briefly, a remote fine positioning mechanism of an optical storage device includes a stationary galvanometer-controlled mirror (galvo mirror) and an imaging lens, the imaging lens being positioned to provide an image of the galvo mirror at the front focal point of an objective lens mounted in an optical head assembly. Thus, for rotation of the galvo mirror to change the direction of the laser beam, the mechanism operates as though the mirror were physically located at, or close to, that focal point. Thus, as the galvo mirror rotates to change the angle of incidence of the laser beam with respect to the objective lens, there is minimal beam clipping and walk off, even where the spot generated by the objective lens is moved over a range of several tracks.

The imaging lens decollimates the beam; therefore to provide the collimated beam required at the objective lens, a collimation-correction lens is positioned "upstream" from the imaging lens. The collimation-correction lens receives the collimated beam from a laser source and converges it at the front focal point of the imaging lens. The latter lens thus passes a collimated beam to the objective lens.

More specifically, the stationary galvo mirror moves the optical beam over a range that encompasses a number of tracks, e.g., 10 to 15. Thus, the galvo mirror, which is capable of high-speed beam movement, can be used for track selection over a limited range of tracks, as well as for track-following when the beam is positioned on a selected track. Remote steering of the beam provides for fast beam movement within the fine track range, while permitting the use of a low-mass, read-write head for enhanced operation of the coarse track-positioning system.

In the preferred embodiment of the invention, the remote fine positioning system is used in a multiple-disk, magneto-optical drive having a plurality of relatively small objective lenses. Each lens is mounted to an air bearing slider of a head assembly associated with a disk surface. The air bearing sliders of the head assemblies are flexibly mounted to a carriage assembly including a coarse actuator that moves linearly back and forth across the disks for coarse track selection. With the air bearings, the sliders are maintained at a prescribed flying height over the disk surfaces.

The front focal point of the objective lens moves toward and away from the imaging lens as the optical head is moved over the surface of the disk in coarse track-positioning operations. Accordingly, this point is located exactly at the principal image plane of the imaging lens for only one position of the optical head. However, even when the focal point is displaced from the image plane, the center of the collimated laser beam is not displaced far from the front focal point and a substantial advantage of the invention will be realized.

Specifically, the imaging lens operates to materially reduce the excursions of the beam at the focal point, as described below. This reduces the position-sensing error to such an extent that the remote galvo mirror can be used to move the laser beam over a range of tracks for fine positioning.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

The above described advantages of the invention can be realized in single-disk-surface systems or multiple-disk systems; the system specifically described herein is a multiple-disk system.

Figure 1:
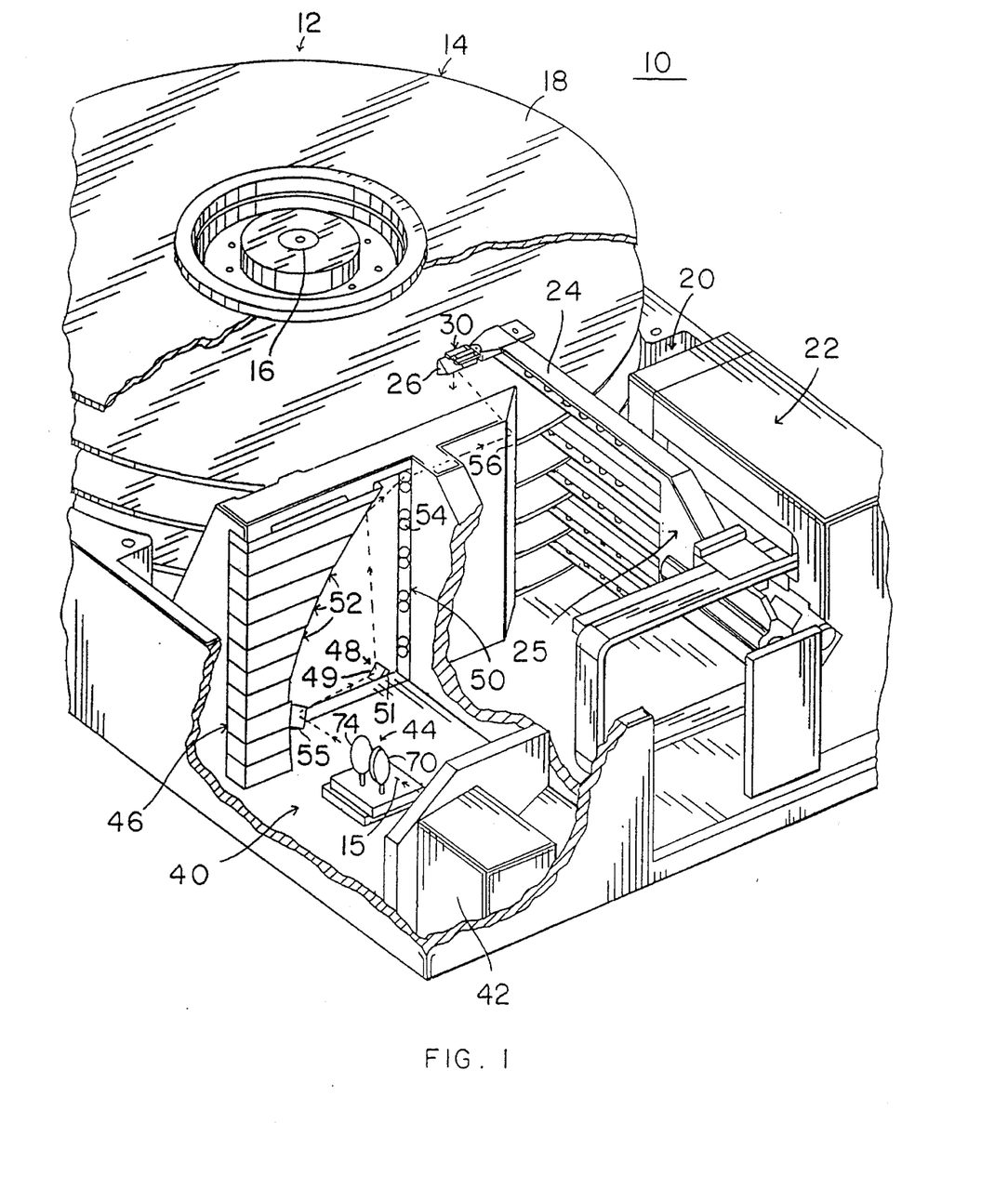
FIG. 1 is a perspective view, partially broken away, of a multiple-disk, magneto-optical storage device having disk, carriage and optical assemblies configured to utilize the apparatus and method of the present invention.

FIG. 1 depicts a multiple-disk, magneto-optical storage device 10 including an optical assembly 40, a carriage assembly 20 and a disk assembly 12, the latter comprising a plurality of double-sided disks 14 axially spaced on a rotatably mounted spindle 16. The top surface 18 of the top disk and the bottom surface of the bottom disk (not shown) are generally not used for data storage; therefore, information is recorded on the remaining disk surfaces comprising pairs of opposing facing recording surfaces.

The carriage assembly 20 generally comprises a linear coarse actuator 22 and a carriage 25 having a plurality of carriage arms 24 vertically spaced and arranged for insertion between the pairs of surfaces of the disks 14. Alternately, a rotary coarse actuator may be used within the teachings of the invention. Mounted to each carriage arm 24 are a folding prism 26 and a pair of head assemblies 30 facing the recording disk surfaces.

Figure 2:
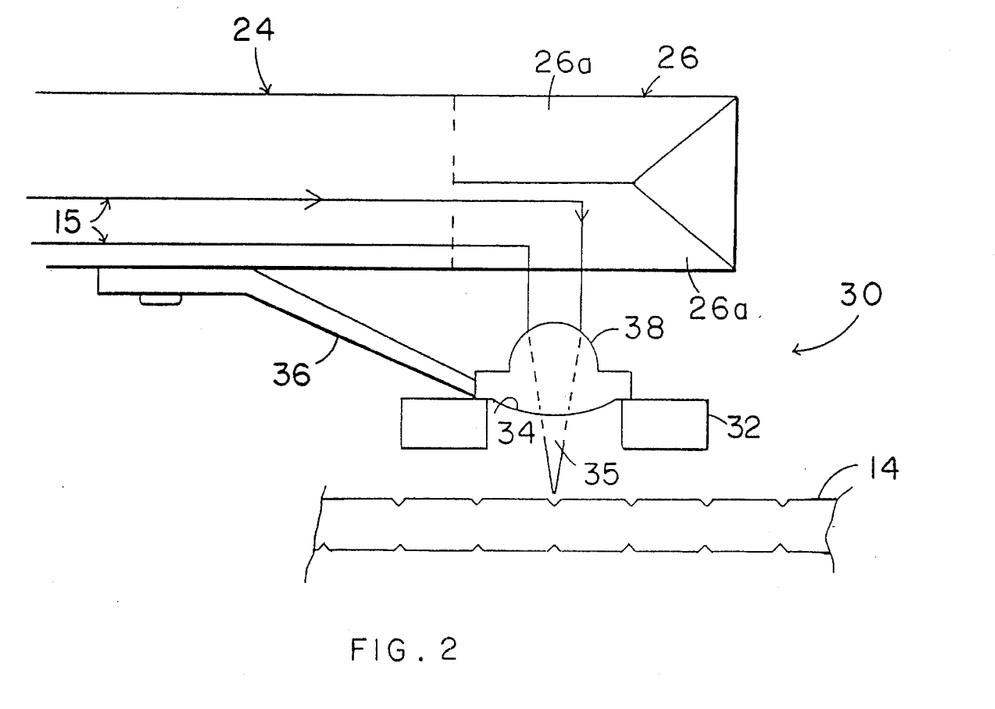
FIG. 2 is a schematic sectional diagram of an optical head assembly of the storage device of FIG. 1.

FIG. 2 is a simplified diagram of an optical head assembly 30. Each head assembly 30 typically includes an air bearing slider 32 flexibly connected to a carriage arm 24 by a resilient flexure 36. The aerodynamic force generated from the interaction between the slider 32 and a spinning disk 14 urging the slider toward the disk surface is counteracted by an opposing spring force from the flexure 36. This allows the air bearing slider 32 to maintain the head assembly 30 at a prescribed flying height (approximately 20–80 microinches) from the disk surface.

An objective lens 38 is mounted in a cavity 34 of each slider 32 such that the nominal optical axis of the lens 38 passes substantially through the center of a slit (not shown), terminating the cavity 34 above the disk surface. The folding prism 26 is rigidly attached to an end of the carriage arm 24; the prism is reflectively coated on both its surfaces 26a. The resulting two-faced mirror 26 directs a laser beam 15 onto the objective lens 38 of the head assembly 30, as described further herein. In operation, the objective lens 38 is moved radially or arcuately across the disk with the head assembly 30 in accordance with the movement of the coarse actuator 22 (FIG. 1).

Referring again to FIG. 1, the optical assembly 40 generally comprises a static optics package 42, a collimation-correction lens assembly 44, a deflection mirror tower (DMT) assembly 46, a fine positioning and disk selection actuator 48, a lens/mirror tower (LMT) assembly 50 and the above-mentioned plurality of objective lenses 38. The static optics package 42 may include a stationary laser source and collimator (not shown) for generating a collimated laser beam 15 used to store and retrieve information from the optical disks 14. Also included in the optics package is a prism assembly (not shown) that includes polarizing beam splitters. The beam splitters guide the laser beam reflected from the disk surfaces to a detection system comprising data and servo detectors. The details of this arrangement are well known and, therefore, are not described herein.

Figure 3:
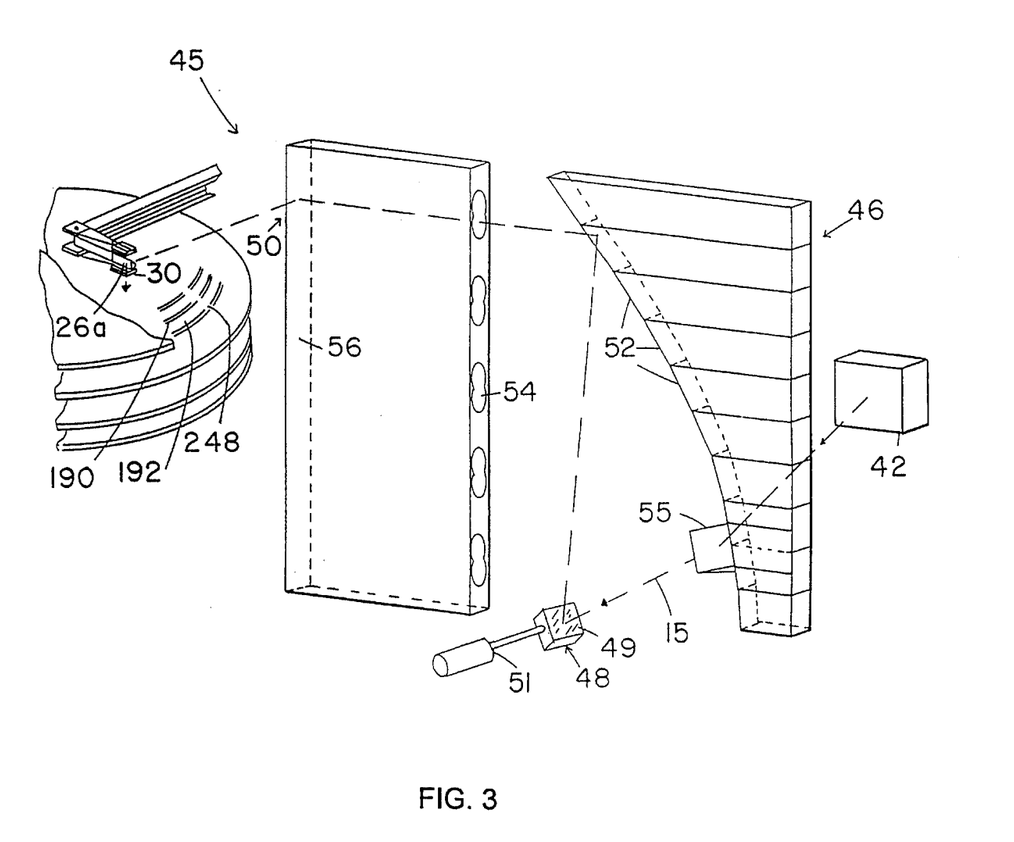
FIG. 3 is a diagram of an optical beam distribution system of the optical assembly of FIG. 1.

FIG. 3 depicts various components of the optical assembly 40, which are arranged to provide an optical beam distribution system 45 for the storage device 10. Specifically, the fine positioning and disk selection actuator 48 preferably comprises a mirror 49 mounted for rotation by a galvanometer (galvo) 51. The mirror 49 functions as a beam steering element that is rotated about a steering axis to direct the laser beam 15 from the optics package 42 to a selected disk surface and onto a selected track on that surface. In addition, the galvo mirror 49 performs remote fine positioning operations as described in detail below. A relay mirror 55, preferably located on the DMT 46, guides the laser beam onto the galvo mirror 49, which then reflects the beam to one of a plurality of individual mirrors 52 on the DMT 46. The mirrors 52 are arranged at various (angular) orientations to deflect the laser beam toward an imaging lens/mirror set 54, 56 contained in the LMT 50. The positions of the mirrors 52 are such that the paths from the galvo mirror 49 to the imaging lenses 54 are of equal length. The mirror elements 56 are preferably configured as a single 45° mirror located at the back of the LMT 50, which directs the beam from any of the lenses 54 to a corresponding folding prism surface 26a and thus onto a selected head assembly 30.

As discussed above, to achieve fast track-seeking performance, it is desirable to employ a fine positioning arrangement that is located remotely from the head assembly. In addition, to employ multiple disks in a standard drive enclosure, the optical path lengths from the mirror 49 and the objective lenses 38 may be long relative to that of a single optical disk storage device. A long path is needed so that the laser beam can be directed from a point source to any of the objective lenses of the head assemblies.

Figure 4:
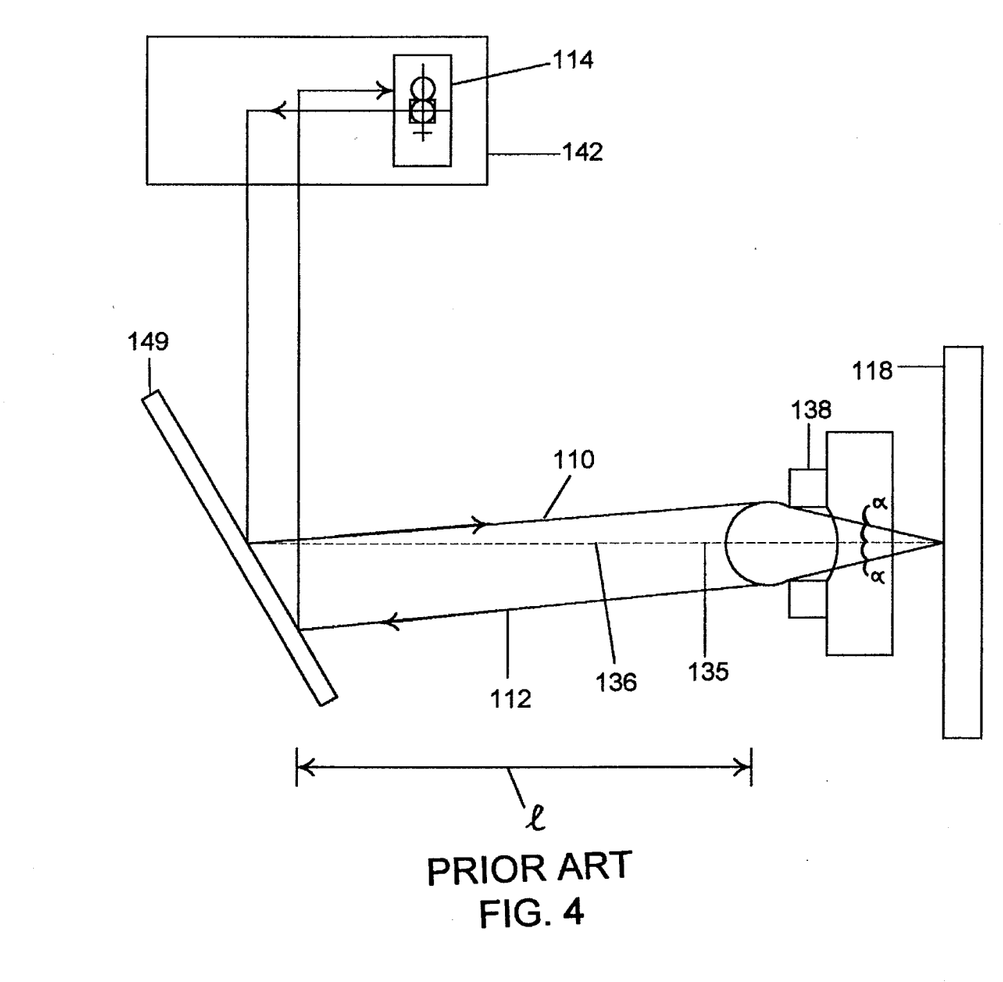
FIG. 4 is a diagram of a prior art arrangement using a remote galvo-controlled mirror to change the angle of a laser beam incident to an objective lens.

In general, a collimated beam passed to an objective lens is converged to a minute spot of light at the disk surface. By changing the angle of incidence of the laser beam relative to the optical axis of the lens, the spot may be radially displaced on the disk surface. It has been suggested in the past that the angular orientation of the laser beam may be remotely altered by a galvo-controlled mirror. FIG. 4 depicts a prior art arrangement using a remote galvo-controlled mirror 149 for this purpose.

As depicted in FIG. 4, slight deflections of the galvo mirror 149 cause small angular adjustments a of the collimated beam over an optical path of length 1, typically causing the laser beam to "walk-off" from the front focal point 135 of the objective lens 138. Specifically, the beam arrives at the lens at a lateral distance 1a from the focal point 135. As a result, the return beam 112 does not coincide with the incident beam 110.

More specifically, any incident light ray passing through the focal point 135 of the objective lens 138 will exit the lens parallel to the optical axis 136 and thus perpendicular to the disk surface 118. The ray will therefore be reflected directly back and, as a result, will follow the path of the incident ray. A collimated beam centered on the focal point 135 will also return along the path of the incident beam. Rays in each half of the beam will not exit the lens parallel to the optical axis 136. However, they will be reflected along the paths of the rays in the other half of the beam.

On the other hand, a beam that does not pass through the focal point 135, e.g., the incident beam 110 in FIG. 4, will not center on a ray parallel to the optical axis 136. The entire beam will thus be reflected in the same direction away from the axis. The return beam 112 will therefore not coincide with the incident beam 110 and, in fact, will make an offset angle 2α with the optical axis 136. The position sensor 114 in the optics package 142 will therefore sense an erroneous beam position. This error, i.e., DC-offset error, may not prevent the signal from being used in track-following operations. However, with the relatively large beam excursion involved in fine track-seeking, the offset error has prevented the use of remote beam steering for that purpose.

Moreover, beam walk-off becomes more acute when the objective lens is relatively small and the optical path is relatively long, particularly as the path 1 varies when the objective lens moves over the disk with movement of the coarse actuator (not shown). This may result in the angular beam being clipped at the objective lens 138, leading to a loss of beam energy.

Figure 5A:
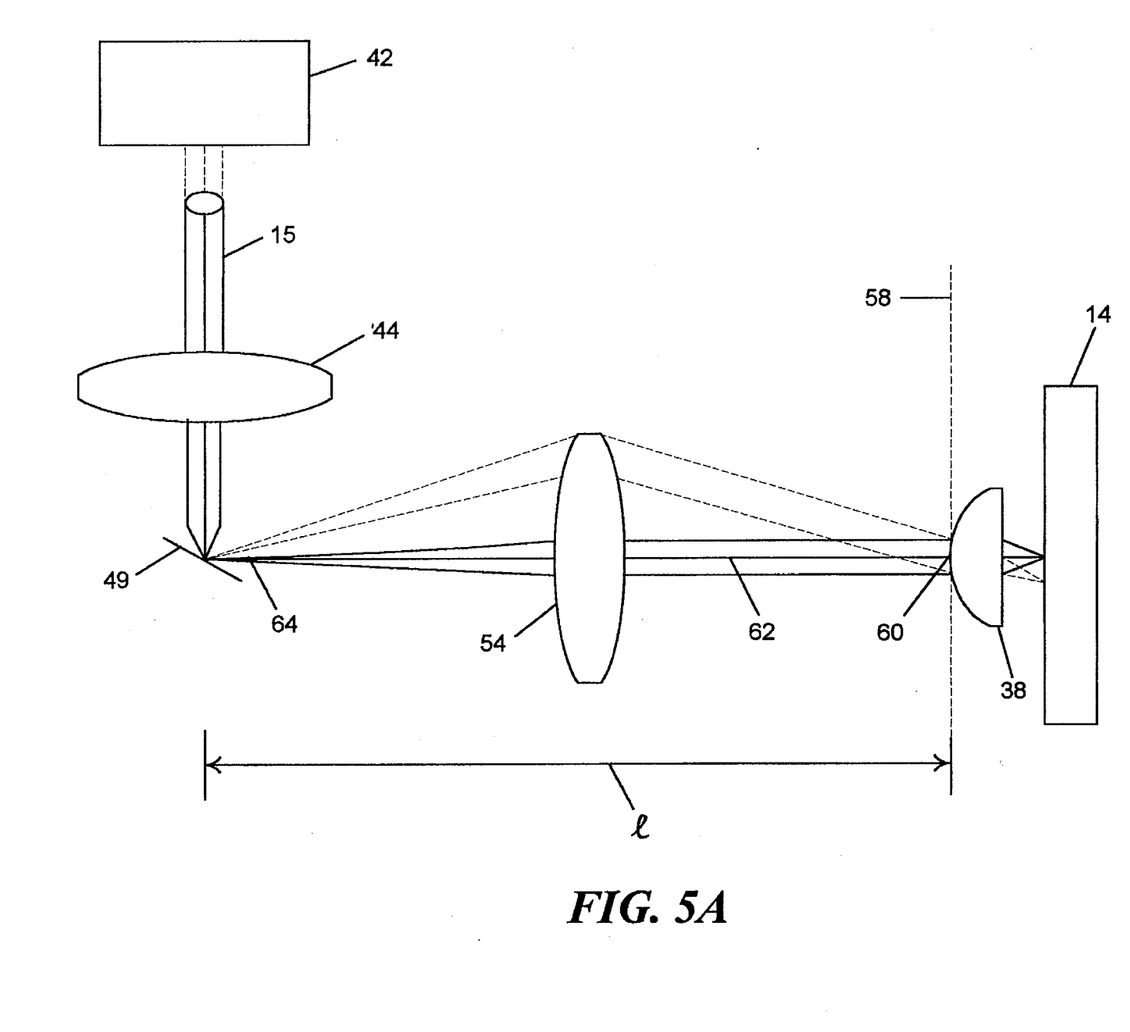
FIGS. 5A and 5B are schematic optical diagrams of the remote fine positioning mechanism in accordance with the invention.
Figure 5B:
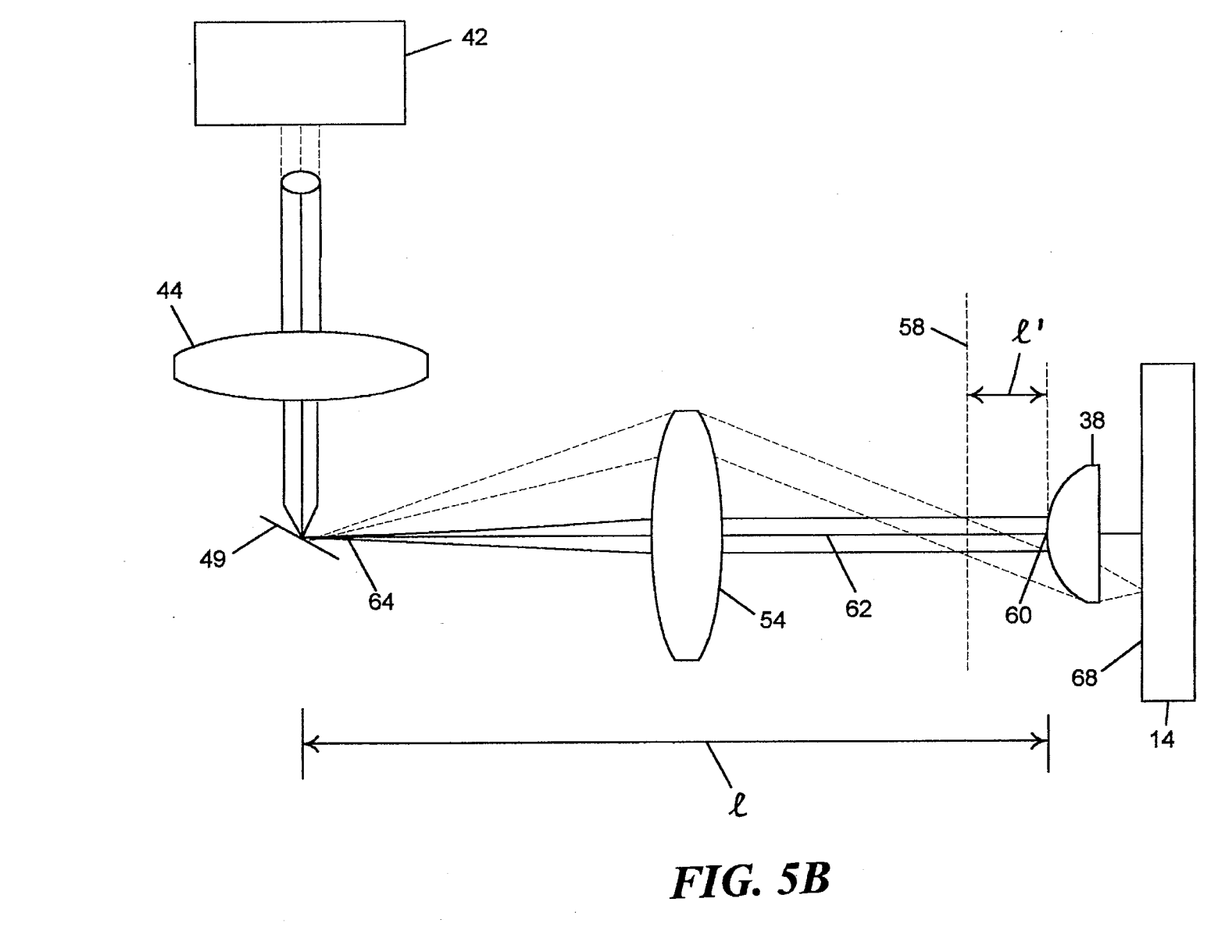

FIGS. 5A and 5B are schematic optical diagrams of the remote fine positioning system of this invention. The objective lens 38 is generally the only portion of the fine positioning system located on the moving head assembly (FIG. 2). To facilitate use of a small head assembly, the objective lens 38 is preferably a small, bi-aspheric lens. The optics package 42, the collimation-correction lens 44, the galvo 48 and an imaging lens 54 constitute the stationary optical components of the system.

In accordance with the invention, the imaging lens 54 is provided to minimize beam walk-off and resulting DC-offset in the track error-signal during remote track selection operations. The imaging lens 54 preferably "images" the galvo mirror 49 (and incident laser beam) at the front focal point 60 of the objective lens 38. Optically, this moves the mirror 49 to the focal point 60 and the incident beam thus passes through the focal point regardless of the angle of the reflected beam. The incident beam can therefore undergo relatively large angular excursions, as required for fine track-seeking, without causing an error in the output of the beam position sensor.

Movement of the carriage 25 (FIG. 1) causes the objective lens 38 to move back and forth along the optical axis 62. The focal point 60 of the lens 38 will therefore coincide with the image plane 58 of the imaging lens 54 at only one carriage position, preferably when the lens 38 is positioned over the middle tracks on the disk 14 (FIG. 5A). However, even at other positions (FIG. 5B), the center of the incident beam is close enough to the focal point 60 to permit fine tracksseeking over a substantial number of tracks. Specifically, at the middle position of the heads:

$$1/f_2 = 1/I - 1/O$$

where, $f_2$ is the effective focal length of the imaging lens;

I is the distance between the image plane of the imaging lens and the front focal point of the objective lens; and O is the distance between the image plane of the imaging lens and the galvo mirror.

In FIG. 5B, the optical path length 1 is the distance between the focal point 60 of the objective lens 38 and the galvo mirror 49. The optical path length 1' is the distance between the image plane 58 of the imaging lens 54 and the focal point 60. By imaging the galvo mirror at the vicinity of the focal point 60, we have decreased the lateral excursion of the beam to a fraction k=1'/1. Accordingly, when the head position is such that the focal point 60 is in the image plane 58, i.e., 1'=0, the beam passes through the focal point regardless of the angle of the mirror 49. The walk-off problem is thus entirely eliminated. At other head positions, the lateral excursion of the beam at the focal point 60 is materially reduced, so that even at those positions, the beam can be moved over a substantial range of tracks on the disk 14 without incurring undue offset of the return beam. It is to be noted that use of a rotary coarse actuator will result in the focal point of the objective lens coinciding with the image plane of the imaging lens at all carriage positions.

A collimated beam arriving at the imaging lens 54 would be decollimated by that lens. The collimation-correction lens 44 functions to provide the desired collimated beam. Specifically, the lens 44 converges the incident beam at the front focal point 64 of the imaging lens 54. The lens 54 thus collimates the beam that it passes on to the objective lens 38. To maintain the same beam diameter at the objective lens 38 as at the optics package 42, the effective focal length $f_1$ of the collimation-correction lens 44 is preferably equal to the effective focal length $f_2$ of the imaging lens 54.

The collimation-correction lens 44 may comprise a single convex lens. However, in the preferred embodiment of the invention, as shown in FIG. 1, the collimation-correction lens 44 comprises two lenses: a negative planoconcave lens 70 and a fixed, positive planoconvex lens 74. The negative lens 70 functions to diverge the originally collimated laser beam 15 and the positive lens 74 subsequently converges it. This assembly, referred to as an inverse telephoto lens assembly, is characterized by a relatively short back focal length and a relatively large front focal length, the combination of which represents the effective focal length $f_1$ of the assembly 44.

In summary, the invention provides enhanced remote fine positioning range for a single or multiple-disk magneto-optical drive that includes a stationary static optics package, a fixed galvanometer with an adjustable mirror, a relatively small moving objective lens and a relatively long optical path between the galvo mirror and the objective lens. The remote fine positioning system also comprises a stationary collimation-correction lens positioned between the static optics package and the galvo mirror, and a fixed imaging lens optically coupled between the galvo mirror and the objective lens. The galvo mirror performs fine track selection by adjusting the angle at which the laser beam passes through the objective lens. The angular orientation of the beam as it passes through the focal point of the objective lens results in changes in the cross-track positioning of the laser beam on the disk surface. The imaging lens ensures that the galvo mirror is imaged to the vicinity of the focal point of the objective lens, while the collimation-correction lens ensures that the beam is collimated when it reaches the objective lens.

The foregoing description has been directed to a specific embodiment of this invention. It will be apparent, however, that variations and modifications may be made to the described embodiment, with the attainment of some or all of its advantages. Therefore, it is the object of the appended claims to cover all such variations and modifications as come within the true spirit and scope of the invention.

What is claimed is:

1. Apparatus for directing the movement of an optical beam to tracks on a disk surface of an optical storage device, said apparatus comprising:

an objective lens having an optical axis passing through a focal point thereof, said objective lens being located close to said disk surface and operating to converge said beam to a spot on said disk surface;

means for steering said optical beam to said objective lens at varying angles relative to said optical axis, said beam steering means configured to rotate about a steering axis thereof; and imaging means for providing substantially at said focal point of said objective lens an image of said beam incident to said steering axis so as to minimize excursions of said optical beam at said focal point, said imaging means having a front focal point; and means for converging said optical beam at the front focal point of said imaging means, said means for steering being disposed between said means for converging and said imaging means, and said imaging means collimating said beam and providing a collimated beam substantially at said focal point of said objective lens.

2. The apparatus of claim 1 wherein said means for steering comprises a galvanometer-controlled mirror.

3. The apparatus of claim 2 wherein said imaging means comprises an imaging lens optically disposed in the path of said beam between said mirror and said objective lens.

4. The apparatus of claim 3 further comprising:

means for generating said optical beam; and means for directing said optical beam along a path including said mirror.

5. The apparatus of claim 4 wherein said generating means comprises a stationary static optics unit.

6. The apparatus of claim 5 wherein said means for converging comprises a collimation-correction lens optically disposed in the path of said beam between said optics unit and said mirror, said collimation-correction lens coverging said beam onto said mirror.

7. A remote fine positioning mechanism for controlling the movement of an optical beam to tracks on a disk surface of an optical storage device and maintaining said beam on a selected track during track selection, said remote fine positioning mechanism comprising:

an objective lens having an optical axis passing through a focal point thereof, said objective lens being located close to said disk surface and operating to converge said beam to a spot on said disk surface;

a stationary fine positioning actuator having a beam steering element and configured to rotate said beam steering element about a steering axis to direct said beam to said objective lens at varying angles relative to said optical axis;

a stationary imaging lens optically disposed in the path of said beam between said actuator and said objective lens, said imaging lens providing substantially at said focal point of said objective lens an image of said beam at said steering axis, thereby minimizing excursions of said optical beam at said focal point; and a collimation-correction lens optically disposed in the path of said beam, said stationary fine positioning actuator being disposed in the path of said beam between said collimation-correction lens and said stationary imaging lens, said collimation-correction lens operating to converge said optical beam at the front focal point of said imaging lens, whereby said imaging lens collimates said optical beam.

8. The remote fine positioning mechanism of claim 7 further comprising:

a static optics unit for generating said optical beam and directing it along a path including said fine positioning actuator.

9. The remote fine positioning mechanism of claim 8 further comprising a carriage assembly including a carriage arm supporting said objective lens, said carriage assembly further comprising a coarse actuator for moving said objective lens across said disk surface.

10. The remote fine positioning mechanism of claim 9 wherein said coarse actuator is a linear coarse actuator.

11. The remote fine positioning mechanism of claim 9 wherein said coarse actuator is a rotary coarse actuator.

* * * * *